(12) United States Patent
Sundquist et al.

(10) Patent No.: US 10,875,232 B2
(45) Date of Patent: Dec. 29, 2020

(54) COMPOSITE PART AND METHOD FOR MAKING COMPOSITE PART

(71) Applicant: The Boeing Company, Chicago, IL (US)

(72) Inventors: David J. Sundquist, O'Fallon, MO (US); John P. Longinette, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 15/478,611

(22) Filed: Apr. 4, 2017

(65) Prior Publication Data
US 2018/0281269 A1    Oct. 4, 2018

(51) Int. Cl.
| | | |
|---|---|---|
| B29C 70/56 | (2006.01) | |
| B29C 51/14 | (2006.01) | |
| B29C 51/10 | (2006.01) | |
| B29C 51/26 | (2006.01) | |
| B29K 105/00 | (2006.01) | |
| B29L 9/00 | (2006.01) | |
| B29L 31/30 | (2006.01) | |

(52) U.S. Cl.
CPC ............ B29C 51/14 (2013.01); B29C 51/10 (2013.01); B29C 51/261 (2013.01); B29C 70/56 (2013.01); B29K 2105/253 (2013.01); B29L 2009/00 (2013.01); B29L 2031/3076 (2013.01)

(58) Field of Classification Search
None
See application file for complete search history.

(56) References Cited

U.S. PATENT DOCUMENTS

| | | | | |
|---|---|---|---|---|
| 5,348,602 A | * | 9/1994 | Makarenko | B29C 70/44 156/160 |
| 9,597,844 B2 | * | 3/2017 | Blot | B29C 70/48 |
| 2009/0091063 A1 | * | 4/2009 | Petersson | B29C 43/12 264/320 |
| 2015/0183171 A1 | * | 7/2015 | Kline | B29C 70/342 156/163 |
| 2015/0258743 A1 | | 9/2015 | Lanard et al. | |
| 2015/0352795 A1 | * | 12/2015 | Coxon | B29C 70/342 264/266 |
| 2016/0207266 A1 | * | 7/2016 | Koncz | B29C 70/02 |

FOREIGN PATENT DOCUMENTS

WO    WO-2017134355 A1 *   8/2017    ............ B29C 70/56

OTHER PUBLICATIONS

Machine Translation of WO-2017134355-A1, retrieved 2019.*
Deck, Eric Eldon, U.S. Appl. No. 15/004,610, filed Jan. 22, 2016.
Sundquist, David J., U.S. Appl. No. 15/004,622, filed Jan. 22, 2016.
(Continued)

*Primary Examiner* — David P Turocy
(74) *Attorney, Agent, or Firm* — Perman & Green LLP

(57) ABSTRACT

A method for drape forming a laminated composite charge, the method including placing the laminated composite charge on a forming tool and redirecting forming forces applied to the laminated composite charge during drape forming to counteract wrinkle forming movement between plies of the laminated composite charge.

20 Claims, 9 Drawing Sheets

(56) References Cited

OTHER PUBLICATIONS

Hallander, et al. "An Experimental Study of Mechanisms Behind Wrinkle Development During Forming of Composite Laminates". Elsevier, Ltd. Composites Part A—Applied Science and Manufacturing; vol. 50, pp. 54-64, 2013.
Sjolander, et al. "Forming Induced Wrinkling of Composite Laminates: A Numerical Study on Wrinkling Mechanisms" Elsevier, Ltd. Composites Part A: Applied Science and Manufacturing; vol. 81, pp. 41-51, 2016.
Hallander, et al. "Forming Induced Wrinkling of Composite Laminates with Mixed Ply Material Properties: An Experimental Study" Elsevier, Ltd. Composites: Part A—Applied Science and Manufacturing; vol. 78, pp. 234-245, 2015.
European Search Report, European Application No. 18163098 dated Aug. 22, 2018.

* cited by examiner

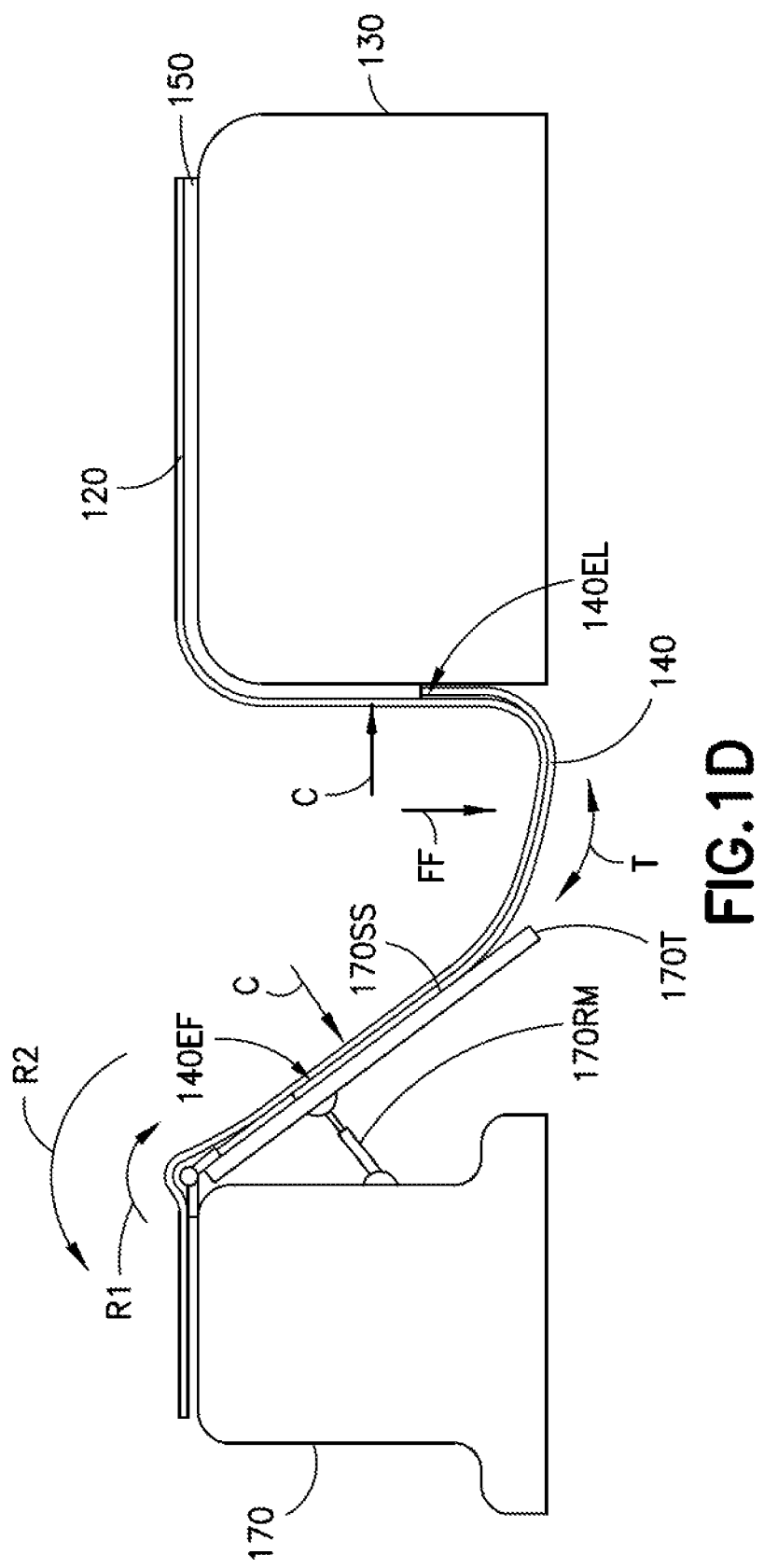

COMPOSITE PART AND METHOD FOR MAKING COMPOSITE PART

BACKGROUND

1. Field

The aspects of the present disclosure generally relate to composite parts and in particular, to reducing wrinkles in the composite parts.

2. Brief Description of Related Developments

In one aspect, composite parts composed of multiple pre-impregnated plies or layers (i.e. a laminated composite) are formed by drape forming. During drape forming, compression of one or more plies occurs in areas of the composite part having excessive material or in areas of the composite part that have geometry changes (e.g. changes in thickness, bends, etc.). The compression of the one or more plies may cause relative movement between the plies resulting in the formation of wrinkles in the composite part. The relative movement between the plies occurs due to several factors including, but not limited to, an imbalance of heat and vacuum during drape forming, such as hot drape forming, where the imbalance of heat and vacuum may cause local forces, such as the compressive forces noted above, in the plies which induce wrinkles.

In some instances, composite parts that include wrinkles are scrapped (e.g. not used). In other instances, a generous strength knock-down factor (e.g. the reduction in load carrying capacity due to wrinkling) is applied to composite parts having wrinkles resulting in additional plies being added to the part over the wrinkles so that the composite part can carry the load the composite part was designed for. Here, the added plies undesirably increase the weight of the composite part.

Generally, where wrinkles are unacceptable in a composite part, caul plates have been used in an attempt to reduce wrinkles by supporting the composite parts during curing or a different manufacturing technique (other than drape forming) is used.

SUMMARY

The following is a non-exhaustive list of examples, which may or may not be claimed, of the subject matter according to the present disclosure.

One example of the subject matter according to the present disclosure relates to a method for drape forming a laminated composite charge. The method comprises placing the laminated composite charge on a forming tool; and redirecting forming forces applied to the laminated composite charge during drape forming to counteract wrinkle forming movement between plies of the laminated composite charge.

Another example of the subject matter according to the present disclosure relates to a method for drape forming a laminated composite charge. The method comprises interleaving tension members into a composite layup of the laminated composite charge, where the tension members are interleaved into the composite lay-up at one or more locations along a length of the laminated composite charge so that a free end of each of the tension members extends from the composite layup; and applying compressive loading to the tension members with a drape forming diaphragm so that the tension members generate tension forces in the composite layup by pulling on the composite layup to counteract wrinkle forming compressive forces generated in the composite layup during drape forming of the laminated composite charge.

Still another example of the subject matter according to the present disclosure relates to a method for drape forming a laminated composite charge. The method comprises forming a laminated composite charge over a forming tool with a drape forming diaphragm, where the laminated composite charge includes one or more profile extensions extending from the laminated composite charge at predetermined locations along a length of the laminated composite charge; and applying tension forces to the laminated composite charge with the one or more profile extensions under compressive loading by the drape forming diaphragm to redirect compressive loading forces on one or more layers of a composite layup of the laminated composite charge and to control an occurrence of inter-laminar wrinkling of the composite layup under compressive loading by the drape forming diaphragm.

Yet another example of the subject matter according to the present disclosure relates to a composite part formed using the methods described herein.

BRIEF DESCRIPTION OF THE DRAWINGS

Figure 1A:
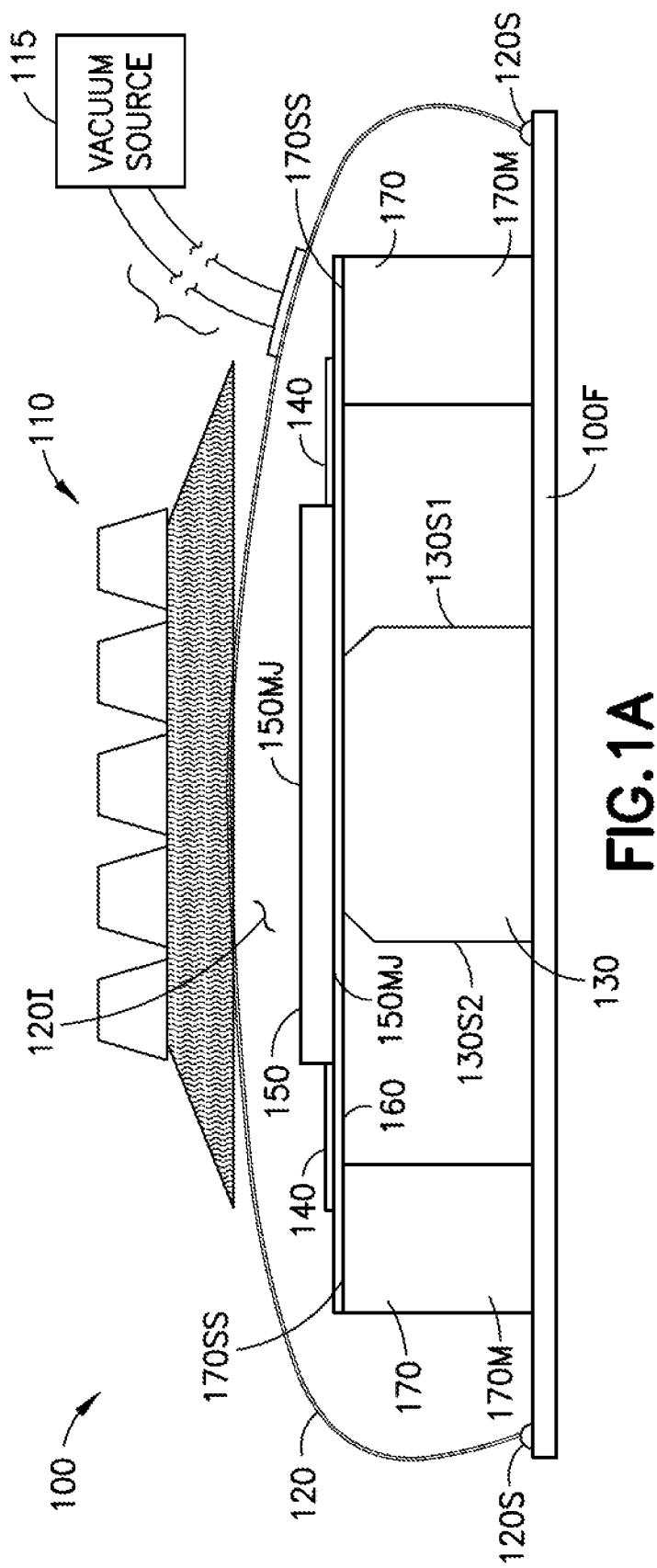
Figure 1B:
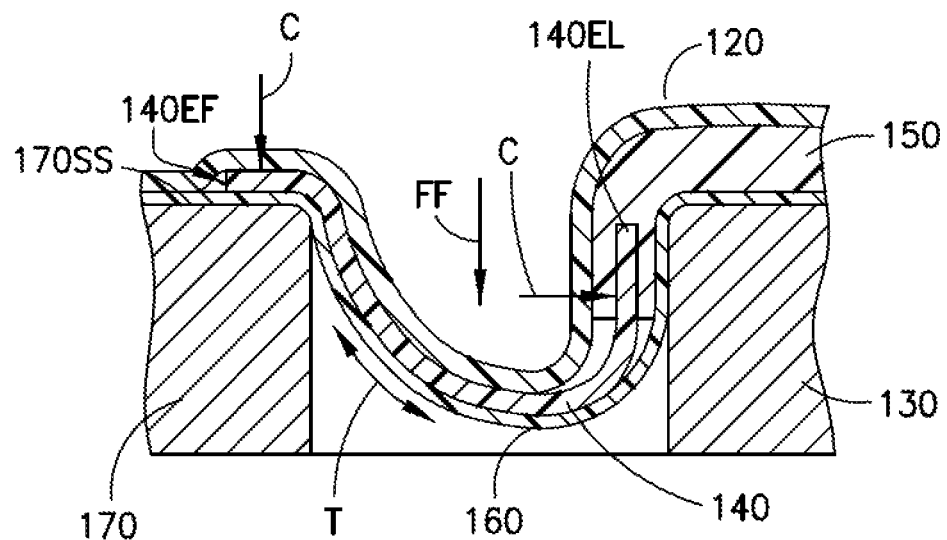
Figure 1C:
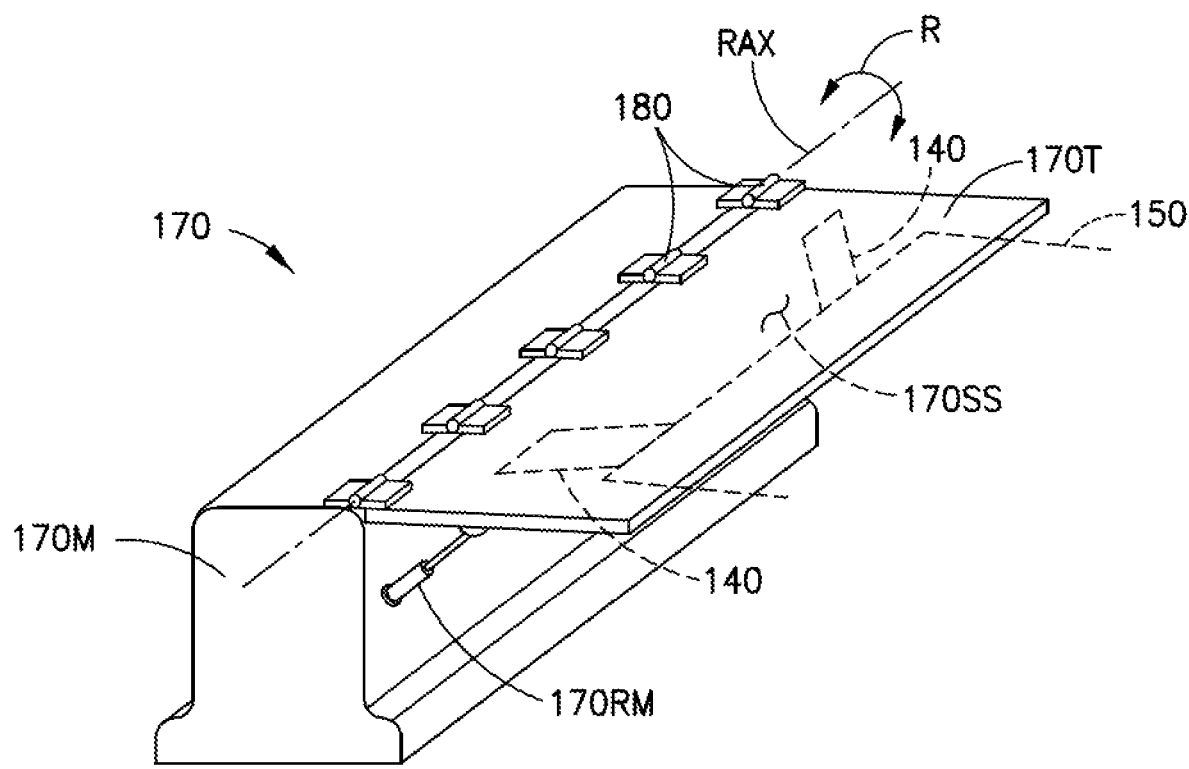
Figure 2:
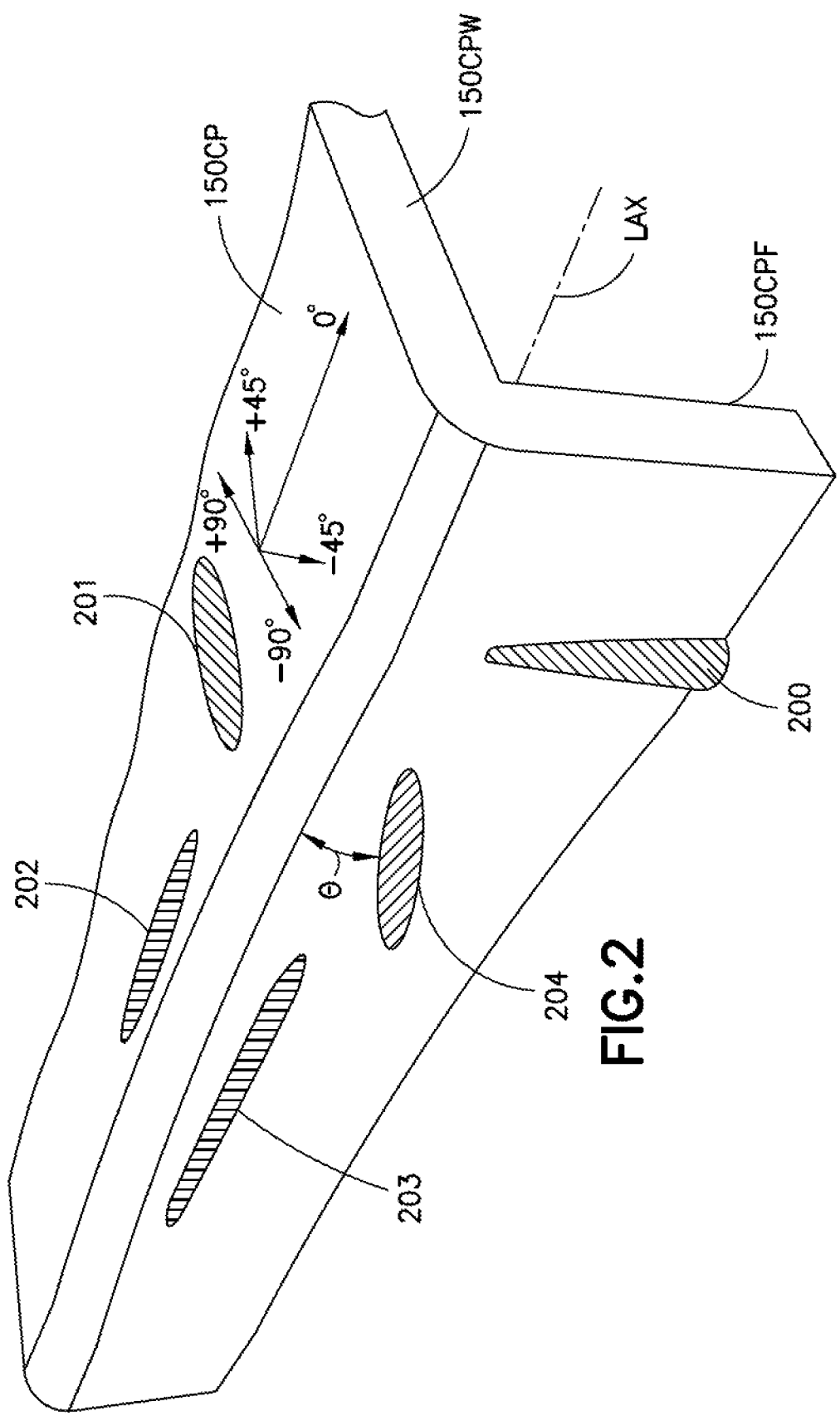
Figure 3A:
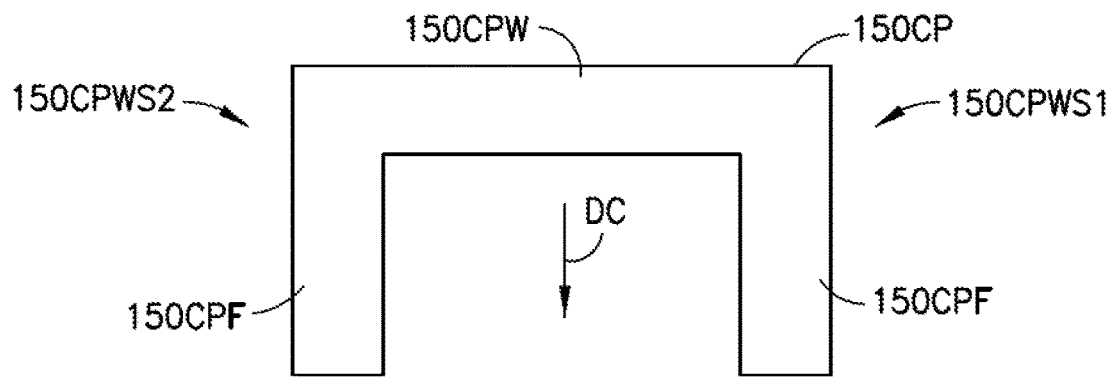
Figure 3B:
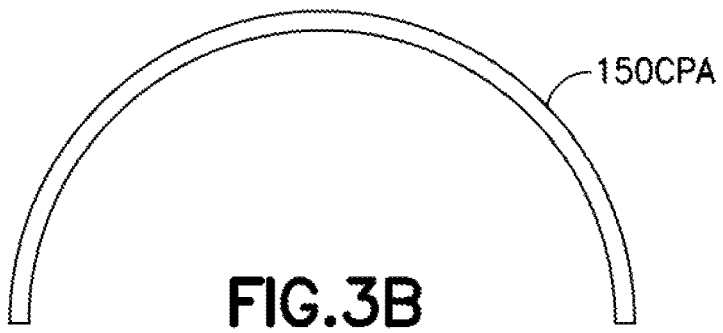
Figure 3C:
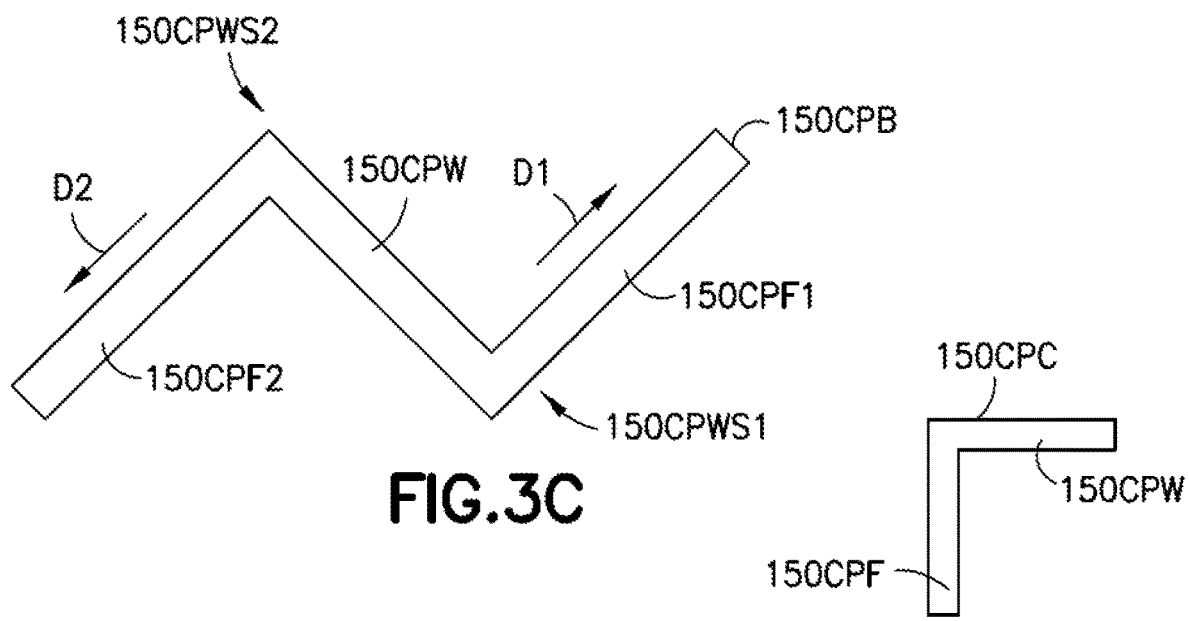
Figure 3D:
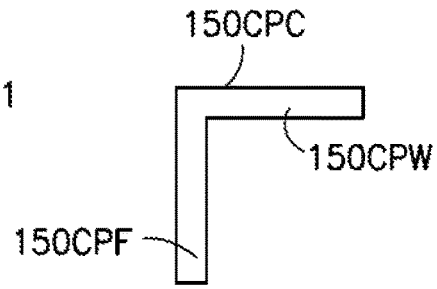
Figure 4:
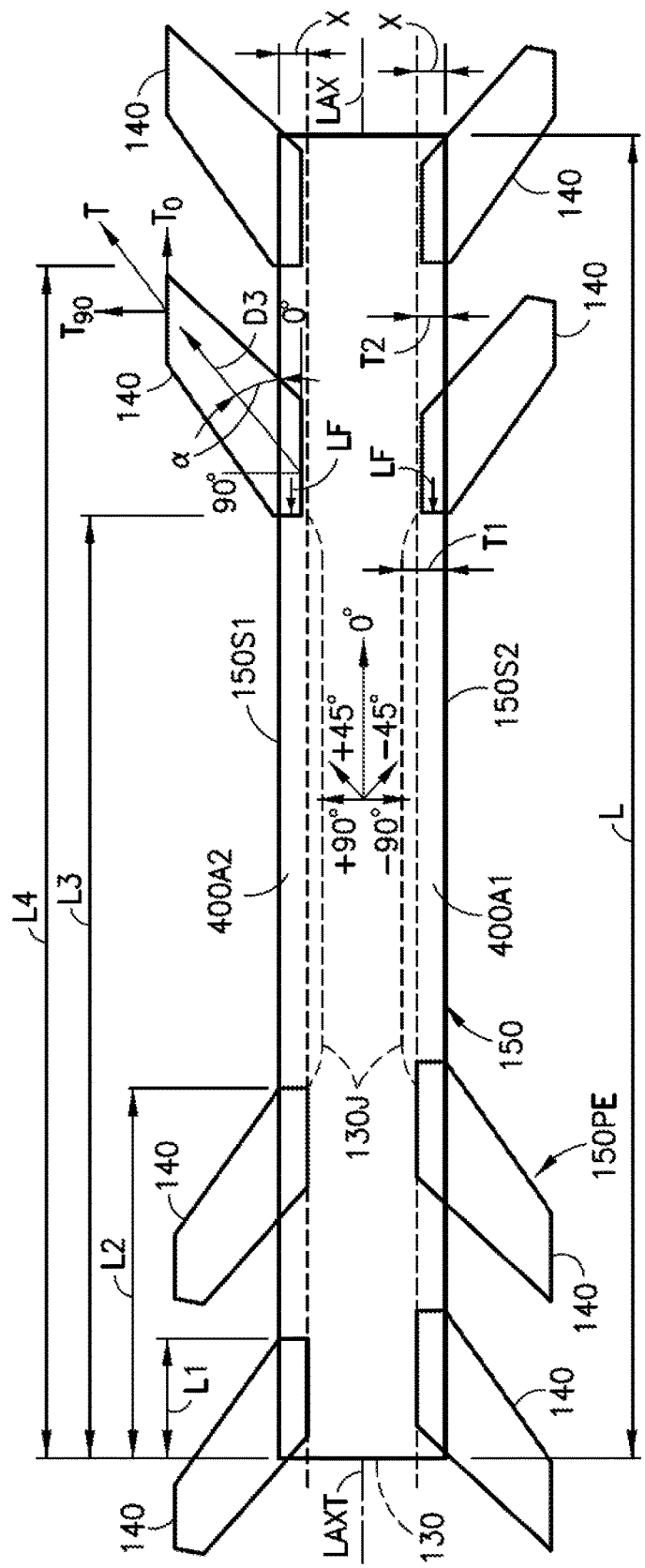
Figure 5:
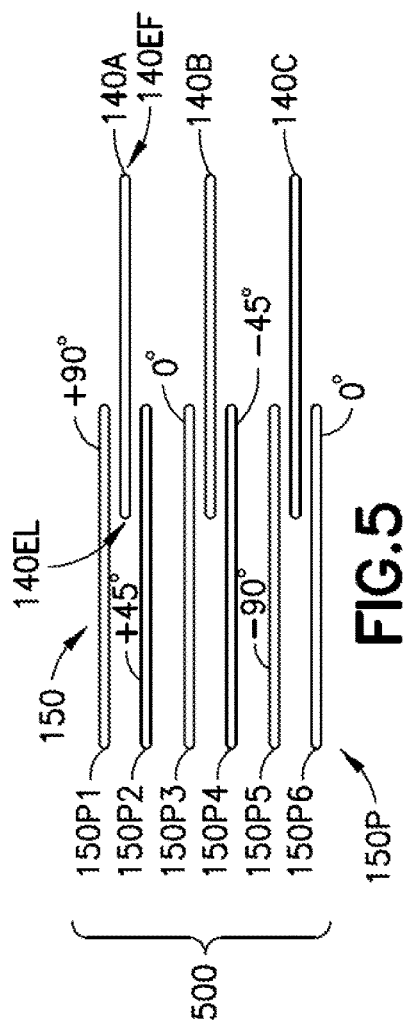
Figure 6:
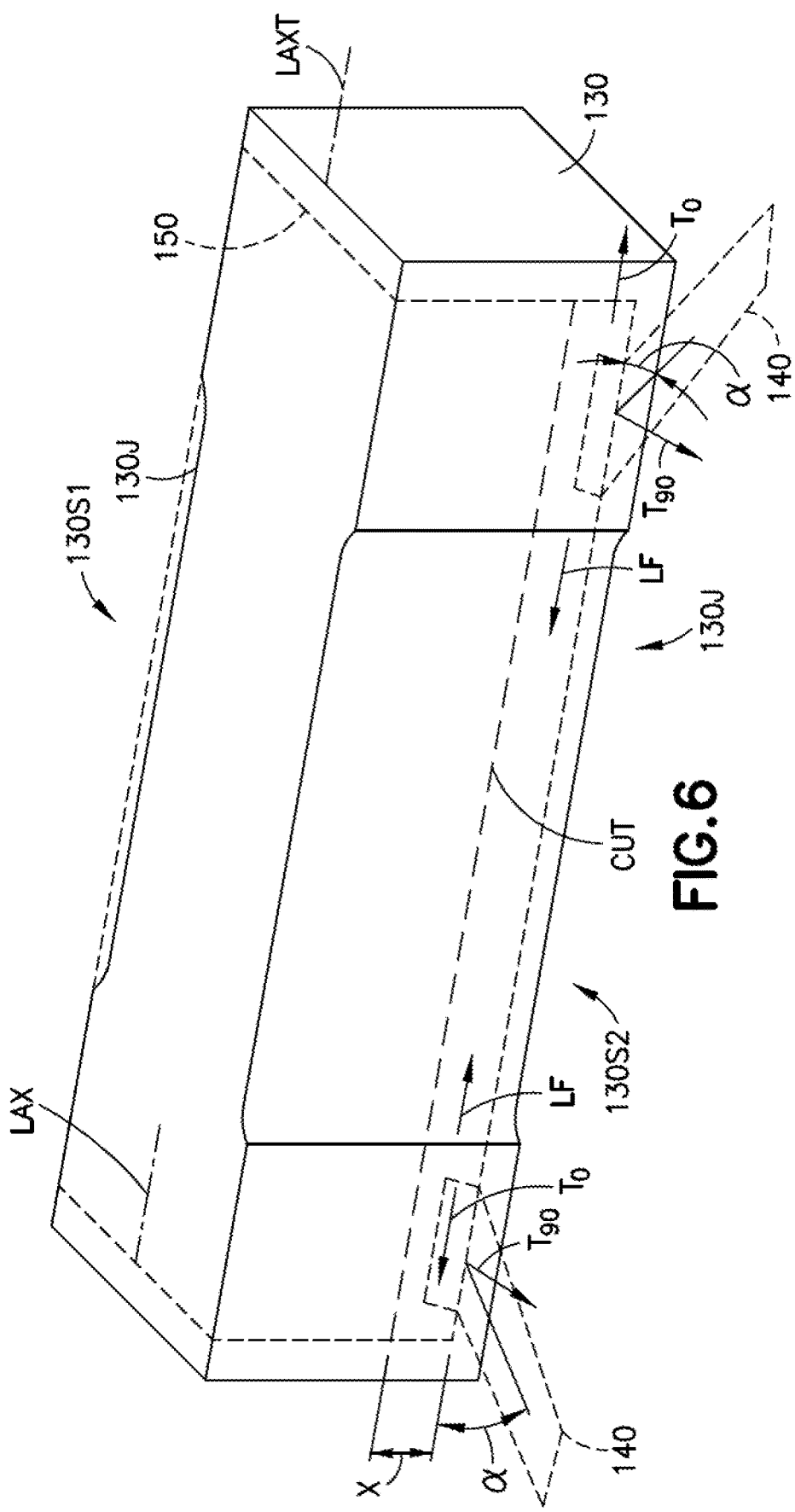
Figure 7:
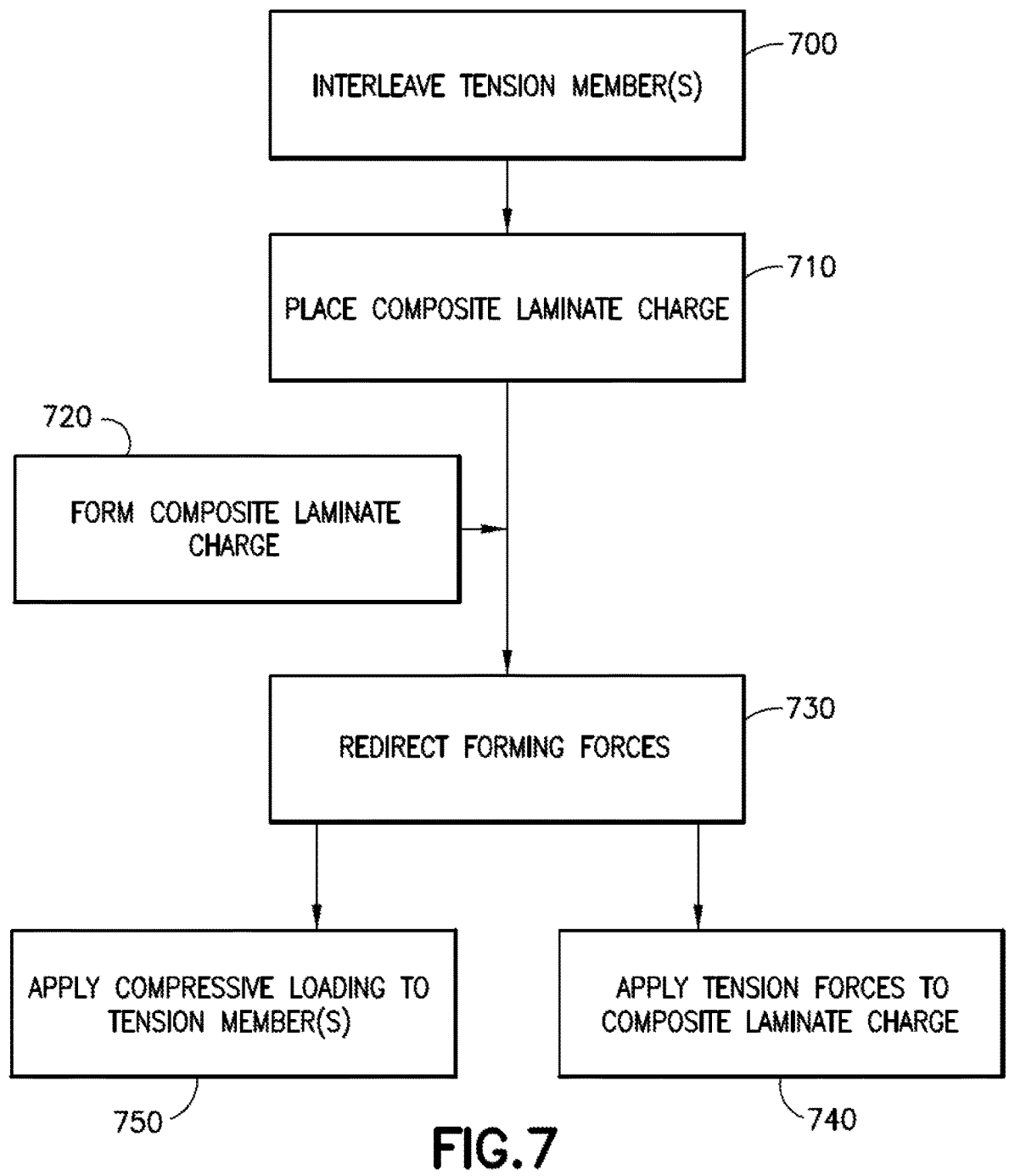
Figure 8:
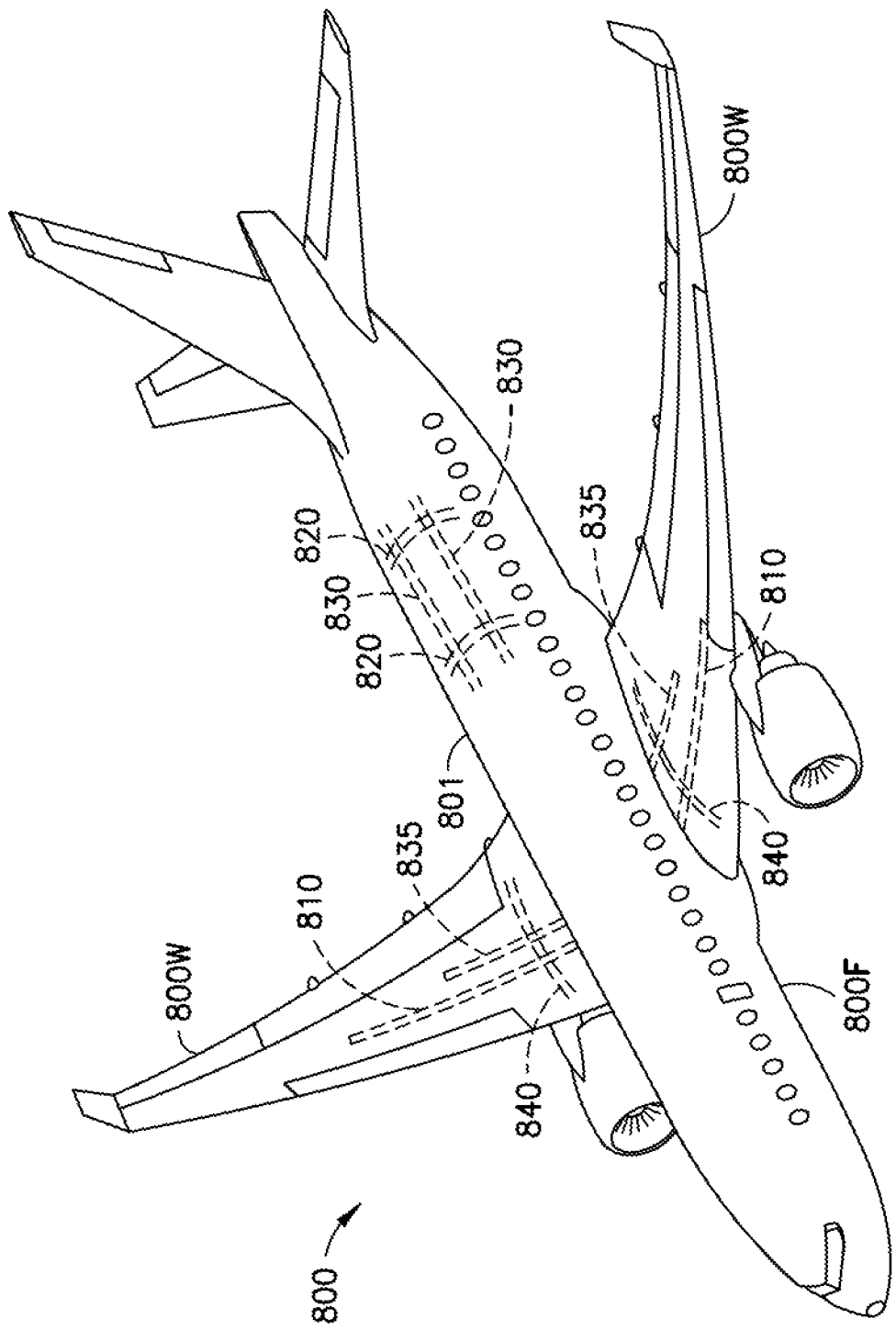

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a front view of a drape forming apparatus in accordance with aspects of the present disclosure;

FIG. 1B is a cross-sectional view of a portion of the drape forming apparatus of FIG. 1 in accordance with aspects of the present disclosure;

FIG. 1C is a perspective view of a portion of the drape forming apparatus of FIG. 1 in accordance with aspects of the present disclosure;

FIG. 1D is a cross-sectional view of a portion of the drape forming apparatus of FIG. 1 in accordance with aspects of the present disclosure FIG. 2 is a perspective view of a composite part in accordance with aspects of the present disclosure;

FIGS. 3A-3D are a schematic cross-sectional illustrations of composite parts formed in accordance with aspects of the present disclosure;

FIG. 4 is a top view of a laminated composite charge in accordance with aspects of the present disclosure;

FIG. 5 is a cross-sectional view of a portion of the laminated composite charge of FIG. 4 in accordance with aspects of the present disclosure;

FIG. 6 is a perspective view of a portion of the drape forming apparatus of FIG. 1 and a formed laminated composite charge in accordance with aspects of the present disclosure;

FIG. 7 is a flow diagram in accordance with one or more methods of the present disclosure; and FIG. 8 is a perspective view of an aircraft including composite parts formed in accordance with aspects of the present disclosure.

DETAILED DESCRIPTION

The apparatus and method described herein facilitate manufacturing a composite part having no wrinkles or additional plies. Accordingly, the aspects of the present disclosure described herein can reduce the number of parts that are scraped, reduce re-work, reduce weight (e.g., from additional plies), and/or allow drape forming to be used to form more complex geometries. More specifically, at least one aspect of this disclosure includes positioning one or more tension members with respect to the laid up plies of a laminate ply such that a tension force will be applied to the tension member(s) to facilitate prevention of wrinkles as the laminate charge is draped over a tool. The tension member(s) can be positioned with respect to the plies so that the tension members(s) will not be included in the final part.

Now, referring to FIGS. 1A, 2, 3A-3D and 4, hot drape forming is a manufacturing process that through the application of vacuum and heat can form a flat laminated composite charge 150 onto a mandrel or forming tool 130. Hot drape forming has a reduced manufacturing cost compared to conventional composite part hand layup and compaction techniques commonly used when manufacturing composite parts. One limitation of hot drape forming is the possible development of wrinkles near composite part features due to an imbalance of forces which lead to scrapped parts or a knocked-down strength of the composite parts. For example, during forming of a composite part, such as composite part 150CP, several types of wrinkles may be formed. In one aspect, chord wrinkles 200, 201 (extending laterally relative to a longitudinal axis LAX of the composite part), span wrinkles 202, 203 (extending longitudinally), and/or off-angle wrinkles 204 (extending at an angle θ between the longitudinal and lateral directions) may be formed as a result of the imbalance of forces during forming of the composite part 150CP. The aspects of the present disclosure can reduce one or more of the chord wrinkles 200, 201, span wrinkles 202, 203 and off-angle wrinkles 204 in composite parts 150CP, 150CPA, 150CPB, 150CPC formed from a laminated composite charge 150 in a drape forming process, such as the hot drape forming process. In one aspect, local forces LF produced in the laminated composite charge 150 during hot drape forming are redirected through one or more tension members 140 to effectively reduce or eliminate wrinkles in the composite parts 150CP, 150CPA 150CPB, 150CPC. The reduction or elimination of the wrinkles reduces the weight of the composite parts (as additional plies are not needed to compensate for the knocked-down strength of the composite part in the wrinkled areas) and also saves cost by eliminating rework of parts (e.g. to add the additional plies) and/or by reducing scrapped parts.

Referring to FIGS. 1A-1D, a drape forming apparatus 100 is illustrated. In this aspect, the drape forming apparatus 100 is a hot drape forming apparatus. In this aspect, the drape forming apparatus 100 includes a frame 100F, a drape forming diaphragm 120, a vacuum source 115 and a heat source 110. In one aspect, the drape forming diaphragm 120 is sealed to the frame with any suitable seal 120S to form a sealed interior space 120I. The vacuum source 115 is coupled to the drape forming diaphragm 120 so as to be in communication with the interior space 120I to evacuate an atmosphere within the interior space 120I during drape forming. The heat source 110 may be disposed relative to the frame 100F so as to be located above a laminated composite charge 150 disposed within the interior space 120I where heat from the heat source 110 radiates toward the laminated composite charge 150 to heat the laminated composite charge 150.

Referring also to FIGS. 3A-3D, any suitable forming tool 130 is coupled to the frame 100F within the interior space 120I. In this aspect, the forming tool 130 is illustrated as having a generally rectangular cross section, so as to form a composite part 150CP having a rectangular channel or "C" shape (e.g. with a web 150CPW and two flanges 150CPF extending from opposite sides 150CPWS1, 150CPWS2 of the web 150CPW in a common direction DC) and/or a composite part 150CPC having an angle or "L" shape (e.g. with a web 150CPW and a single flange 150CPF extending from the web 150CPW—see FIG. 3D); while in other aspects, the forming tool 130 may be shaped to form a composite part 150CPA (see FIG. 3B) having an arcuate cross section or a composite part 150CPB (see FIG. 3C) having a zig-zag or "Z" shape (e.g. with a web 150CPW and a first flange 150CPF1 extending from opposite side 150CPWS1 in a first direction D1 and a second flange 150CPF2 extending from opposite side 150CPWS2 a second direction D2 that is substantially opposite the first direction D1).

Referring also to FIGS. 1B, 1C and 1D, one or more standoffs 170 are also coupled to the frame 100F adjacent one or more sides 130S1, 130S2 of the forming tool 130. In one aspect, each standoff 170 includes a support surface 170SS disposed thereon. In one aspect, at least one standoff 170 is a unitary one-piece monolithic member (e.g. no moving parts) where the monolithic member 170M forms the support surface 170SS (see FIGS. 1A and 1B); while in other aspects, at least one of the standoff includes a movable tray 170T adjacent the forming tool 130. In one aspect, where the standoff is a monolithic member 170M without any moving parts, a tensioning film 160 may be placed over the forming tool 130 so as to extend from the forming tool 130 to the support surface 170SS where the tensioning film 160 supports the laminated composite charge 150 prior to drape forming. In one aspect, where the standoff 170 includes the movable tray 170T, the movable tray 170T is pivotally coupled to the monolithic member 170M, such as with hinges 180, so that the movable tray 170T pivots in direction R about axis RAX relative to the monolithic member 170M. In one aspect, the movable tray 170T forms the support surface 170SS and is biased, such as by any suitable resilient member 170RM, in direction R2 in the position illustrated in FIG. 1C so that the movable tray 170T extends towards the forming tool 130 so as to support the laminated composite charge 150 prior to drape forming.

Referring to FIGS. 4, 5 and 6, as described above, local forces LF produced in the laminated composite charge 150 during hot drape forming are redirected through one or more tension members 140 to effectively reduce or eliminate wrinkles in the composite parts 150CP, 150CPA, 150CPB, 150CPC, where the tension members 140 form one or more profile extensions 150PE of the laminated composite charge 150. The one or more tension members 140 are interleaved into one or more peripheral areas 400A1, 400A2 (that do not form part of the finished composite part 150CP, 150CPA, 150CPB, 150CPC; and can also be referred to as "manufacturing excess") of the laminated composite charge 150 so that the one or more tension members 140 can be removed from the composite parts 150CP, 150CPA, 150CPB, 150CPC after forming. In one aspect each peripheral area 400A1, 400A2 extends a predetermined distance X from a respective lateral side 150S1, 150S2 of the laminated composite charge 150 towards the longitudinal axis LAX of the laminated composite charge 150. In one aspect, each tension member 140 includes an interleaved end 140EL and a free end 140EF where the interleaved end 140EL is disposed between adjacent plies 150P of the composite layup 500 and the free end 140EF extends from the composite layup 500. In one aspect, the one or more tension members 140 are interleaved into the composite layup 500 of the laminated composite charge 150 so as to extend from the composite layup 500 in a predetermined direction D3 (e.g. defined by angle α which is at an angle to the rosette RS of the laminated composite charge 150, where the rosette RS defines the 0° fiber angle of the laminated composite charge 150) such that forming forces FF applied to the one or more tension members 140 cause tension T forces to be applied to the laminated composite charge 150 by the one or more tension members 140.

In one aspect, the one or more tensions members 140 are interleaved into the laminated composite charge 150 so as to extend from a respective lateral side 150S1, 150S2 of the laminated composite charge 150 at a predetermined angle α relative to, for example, one or more of the longitudinal axis LAX of the laminated composite charge 150 or a longitudinal axis LAXT of the forming tool 130. For example, in one aspect, the longitudinal axis LAX of the laminated composite charge 150 extends along a longitudinal axis LAXT of the forming tool 130. In one aspect, the longitudinal axis LAX corresponds to (e.g. extends along) a 0° fiber direction of a composite layup 500 of the laminated composite charge 150 so that the tension members 140 extend at the predetermined angle α relative to the 0° fiber direction. For example, as illustrated in FIG. 4, the laminated composite charge 150 includes a fiber rosette where the 0° fiber direction extends along the longitudinal axis LAX of the laminated composite charge 150 and the +90° and −90° fiber directions extend laterally relative to the longitudinal axis LAX. Here the one or more tension members 140 are interleaved into the composite layup 500 so as to extend from the laminated composite charge 150 at an angle between the 0° fiber direction (defined by the rosette RS of the laminated composite charge 150) and the +/−90° fiber direction of the composite layup 500, e.g. the angle α is between the 0° fiber direction and a respective one of the +/−90° fiber direction (depending on which lateral side 150S1, 150S2 the tension member 140 extends from), the so that tension T force produced by the respective tension member 140 includes a longitudinal component $T_0$ and a lateral component $T_{90}$. Here one or more of the longitudinal component $T_0$ and the lateral component $T_{90}$ places one or more plies 150P of the composite layup 500 in tension during drape forming to reduce or eliminate one or more of the chord wrinkles 200, 201, span wrinkles 202, 203 and/or off-angle wrinkles 204 (see FIG. 2). For example, the longitudinal component $T_0$ acts to reduce or eliminate the chord wrinkles 200, 201, the lateral component $T_{90}$ may act to reduce or eliminate the span wrinkles 202, 203 and a combination of the lateral component $T_0$ and the longitudinal component $T_{90}$ may act to reduce or eliminate the off-angle wrinkles 204. In one aspect, the one or more tension members 140 (and the profile extensions 150PE formed thereby) constrain movement between the plies 150P of the laminated composite charge 150.

In one aspect, the one or more tension members 140 are interleaved into the laminated composite charge 150 so as to be adjacent at least one ply 150P of the laminated composite charge 150 having a predetermined ply characteristic. In one aspect, the predetermined ply characteristic is one or more of a fiber orientation and a position within a composite layup of the laminated composite charge. For example, referring to FIG. 5, the laminated composite charge 150 is illustrated as having a composite layup 500 that includes at least plies 150P1-150P6. For exemplary purposes only, ply 150P1 may have a ply orientation of +90°, ply 150P2 may have a ply orientation of +45°, ply 150P3 may have a ply orientation of 0°, ply 150P4 may have a ply orientation of −45°, ply 150P5 may have a ply orientation of −90° and ply 150P6 may have a ply orientation of 0°. Here a tension member 140A is placed between the plies 150P1, 150P2, a tension member 140B is placed between the plies 150P3, 150P4 and a tension member 140C is placed between the plies 150P5, 150P6. In one aspect, the tension members 140 are interleaved in the laminated composite charge 150 through a thickness of the laminated composite charge 150 (e.g. between major surfaces 150MJ of the laminated composite charge).

In one aspect, the one or more tension members 140 are interleaved into the laminated composite charge 150 at the predetermined locations L1, L2, L3, L4 along a length L of the laminated composite charge. In one aspect, the predetermined locations L1-L4 correspond to geometry changes in a profile of the forming tool 130, such as at locations of joggles 130J (e.g. areas of the forming tool 130 that are recessed or protruded and have angled or curved transitions to the recess or protrusion) in the forming tool 130. In one aspect, the predetermined locations L1-L4 correspond to geometry changes in a profile of the laminated composite charge 150, such as where a thickness T1 of the laminated composite charge 150 increases or decreases compared to a thickness T2 of adjacent areas of the laminated composite charge 150.

In one aspect, forming forces exerted on the laminated composite charge 150 produce local forces LF in the laminated composite charge 150 at the areas of the laminated composite charge 150 corresponding to the geometry changes of the forming tool 130 and/or the geometry changes of the laminated composite charge 150. These local forces LF cause relative movement between the plies 150P1-150P6 of the composite layup 500 that are counteracted by the tension T provided by the one or more tension members 140 (noting that, for example, the longitudinal component $T_0$ is acting in a direction substantially opposite the local force LF).

In one aspect, at least one or two or more tension members 140 are stacked on top of each other (as illustrated in FIG. 5) at a common location, such as one or more of predetermined locations L1-L4, along the length L of the laminated composite charge 150 to form one or more profile extensions 150PE of the laminated composite charge 150 and so that tension can be applied to one or more plies 150P1-150P6 of the laminated composite charge 150. Where two or more tension members 140 are stacked on top of each other to form a profile extension 150PE, the tension T applied to the laminated composite charge 150 may be increased compared to the tension T applied by a single tension member 140 by effectively strengthening the profile extension 150PE (formed by the stacked tension members) at the common location. In one aspect, the one or more tension members may be cut from excess or scrap material resulting from cutting from plies 150P1-150P6 when forming the composite layup 500 prior to hot drape forming the laminated composite charge 150.

Referring now to FIGS. 1A, 4, 5, 6 and 7, when drape forming the laminated composite charge 150 to form the composite parts 150CP, 150CPA, 150CPB, 150CPC, the one or more tension members 140 are interleaved (FIG. 7, Block 700) into the composite layup 500 of the laminated composite charge 150 as described above, where the one or more tension members 140 are interleaved into the composite layup 500 at one or more locations L1-L4 along a length L of the laminated composite charge 150 so that a free end 140EF of each of the tension members extends from the composite layup 500. The laminated composite charge 150 including the one or more tension members 140 is placed (FIG. 7, Block 710) on the forming tool 130 so that the one or more tension members 140 and at least part of the laminated composite charge 150 are supported by the support surface 170SS. For example, as can be seen in FIG. 1A, the tensioning film 160 extends from the forming tool 130 to each standoff 170 where the one or more tension members 140 also extend to a respective standoff 170 and the lateral sides 150S1, 150S2 of the laminated composite charge 150 are supported by the tensioning film 160 (and ultimately supported by the respective standoff 170). Similarly, referring to FIG. 1C, where the standoff 170 includes the movable tray 170T, the laminated composite charge 150 extends from the forming tool 130 to the support surface 170SS of the movable tray 170T where the one or more tension members 140 are also disposed on the support surface 170SS. In one aspect, the tensioning film 160 and the movable tray 170T prevent sagging of the laminated composite charge 150 due to, e.g., gravity prior to drape forming, while the standoff 170 prevents the drape forming diaphragm 120 from deforming the laminated composite charge 150 prior to drape forming.

In one aspect, the laminated composite charge 150 is formed (FIG. 7, Block 720) over the forming tool 130 with the drape forming diaphragm 120, where the laminated composite charge includes one or more profile extensions 150PE, formed by one or more respective tension members 140, extending from the laminated composite charge 150 at the predetermined locations L1-L4 along the length L of the laminated composite charge 150. For example, the vacuum source 115 evacuates or otherwise removes the atmosphere/air from within the interior space 120I so that the drape forming diaphragm 120 contacts at least the laminated composite charge 150, the one or more tension members 140, and the standoffs 170. As the atmosphere is evacuated from the interior space 120I the drape forming diaphragm 120 applies forming forces FF on the laminated composite charge 150, the one or more tension members 140, and the standoffs 170 so that the laminated composite charge 150, the one or more tension members 140, and the standoffs 170 are placed in compression.

The forming forces applied to the laminated composite charge are redirected (FIG. 7, Block 730) during drape forming to counteract wrinkle forming movement between plies 150P of the laminated composite charge 150, where for example, the forming forces are redirected by applying tension T forces to one or more tension members 140 interleaved into the peripheral area 400A1, 400A2 of the laminated composite charge 150. In one aspect, the forming forces FF are redirected by generating tension T forces in the laminated composite charge 150 using the forming forces FF at locations, such as predetermined locations L1-L4, where the forming forces FF result in compression stress build up in the composite layup 500 of the laminated composite charge 150. In one aspect, the forming forces FF are redirected by interleaving an interleaved end 140EL of one or more tension members 140 into the composite layup 500 of the laminated composite charge 150 and fixing a position of the free end 140FE of the one or more tension members 140 relative to the composite layup 500 so that the one or more tension members 140 are placed in tension T by forming forces FF applied during drape forming.

In one aspect, the compressive loading applied to the tension members (FIG. 7, Block 750) with the drape forming diaphragm 120 is applied so that the tension members 140 generate the tension T forces in the composite layup 500 by pulling on the composite layup 500, such as in at least a direction substantially opposite to the local forces LF, to counteract wrinkle forming compressive forces, e.g. the local forces LF, generated in the composite layup 500 during drape forming of the laminated composite charge 150. In one aspect, the tension T forces are applied to the laminated composite charge 150 (FIG. 7, Block 740) with the one or more profile extensions 150PE, formed by one or more respective tension members 140, under compressive loading by the drape forming diaphragm 120 to redirect compressive loading forces on one or more plies 150P of the composite layup 500 of the laminated composite charge 150 and to control an occurrence of inter-laminar or out of plane wrinkling of the composite layup 500 under compressive loading by the drape forming diaphragm 120.

In one aspect, the free end 140EF of the one or more tension members 140 is constrained under compressive loading between the drape forming diaphragm 120 and the standoff 170 adjacent the forming tool 130. In one aspect, the tension T forces are generated by one or more tension members 140 interleaved in the laminated composite charge 150 where a free end 140EF of the one or more tension members 140 is constrained at a fixed location, such as on the support surface 170SS, under compressive loading by the drape forming diaphragm 120 and an interleaved end 140EE of the one or more tension members 140 pulls on the laminated composite charge 150 under compressive loading by the drape forming diaphragm 120; in other aspects the free end 140EF of the one or more tension members may be constrained at the fixed location such as by pinning, taping or otherwise mechanically or chemically fastening the free end 140EF to the support surface 170SS or other surface of the standoff 170. For example, as can be seen in FIG. 1B, where the tensioning film 160 is used, the forming forces FF place the free end 140EF of the one or more tension members 140 (and the profile extensions 150PE formed thereby) under a compressive load C generated by the drape forming diaphragm 120 so that the free end 140EF of the one or more tension members 140 is constrained under compressive loading between the drape fording diaphragm 120 and the tensioning film 160 extending from the forming tool 130. Here the compressive load C constrains or otherwise holds the free end 140EF on the support surface 170SS during the drape forming process. As the free end 140EF of the one or more tension members 140 is constrained or otherwise held on the support surface 170SS and the interleaved end 140EL is captured within the composite layup 500 (again by compressive forces C generated by the drape forming diaphragm 120) so that the compressive loading applied by the drape forming diaphragm 120 causes the one or more tension members to be placed in tension T.

Similarly, as can be seen in FIG. 1D, the free end 140EF of the one or more tension members 140 is constrained under compressive loading (e.g. the compressive load C) between the drape forming diaphragm 120 and the movable tray 170T adjacent the forming tool 130, where the drape firming diaphragm 120 moves the movable tray 170T relative to the forming tool 130. For example, the forming forces FF applied to the movable tray 170T by the drape forming diaphragm 120 pivots the movable tray 170T in direction R1 about the axis RAX. As the movable tray pivots in direction R1, the free end 140EF of the one or more tension members 140 is constrained or otherwise held on the support surface 170SS and the interleaved end 140EL is captured within the composite layup 500 (again by compressive forces C generated by the drape forming diaphragm 120) so that the compressive loading applied by the drape forming diaphragm 120 causes the one or more tension members to be placed in tension T.

In one aspect, the one or more tension members 140 are removed from the laminated composite charge 150 after drape forming. For example, the laminated composite charge 150 may be cut along line CUT after drape forming to remove the one or more tension members to form the finished composite parts 150CP, 150CPA, 150CPB, 150CPC. As such, the composite parts 150CP, 150CPA, 150CPB, 150CPC are formed using the aspects of the present disclosure described herein.

As described herein, redirecting the local forces LF developed in the laminated composite charge 150 during hot drape forming, in the manner described herein, reduces or eliminates the wrinkles formed in the composite part 150CP, 150CPA, 150CPB, 150CPC. By including the profile extensions 150PE formed by respective tension member(s) 140 into the laminated composite charge 150, the compression forces produced during drape forming can be controlled to reduce or eliminate the wrinkles. As described herein, the tension members 140 are placed in areas of the laminated composite charge subject to wrinkling and add tension T forces into these areas at an angle relative to, for example, the rosette RS (e.g. defining the 0° direction) of the laminated composite charge 150. These tension T forces are developed on the tension members 140 by interacting with the standoff 170 and/or tensioning film 160 in the drape forming process and are directed into the laminated composite charge 150 through ply 150P to ply 150P interactions to effectively reduce or eliminate wrinkling in the composite part 150CP, 150CPA, 150CPB, 150CPC.

In one aspect, referring to FIG. 8, the composite part 150CP, 150CPA, 150CPB, 150CPC may form a structural component of any suitable vehicle, such as the aircraft 800. For example, the composite part 150CP, 150CPA, 150CPB, 150CPC may form a component of the airframe 800F. In one aspect, the composite part 150CP, 150CPA, 150CPB, 150CPC may form a wing spar 810, a frame 820 of the fuselage 801, stringers 830, 835 of the fuselage 801 or wings 800W, ribs 840 of the wings 800W or any other suitable structural component of the aircraft 800.

The following are provided in accordance with the aspects of the present disclosure:

A1. A method for drape forming a laminated composite charge, the method comprising:
placing the laminated composite charge on a forming tool; and
redirecting forming forces applied to the laminated composite charge during drape forming to counteract wrinkle forming movement between plies of the laminated composite charge.

A2. The method of paragraph A1, wherein the forming forces are redirected by applying tension forces to one or more tension members interleaved into a peripheral area of the laminated composite charge.

A3. The method of paragraph A2, wherein the forming forces are redirected by interleaving an interleaved end of one or more tension members into a composite layup of the laminated composite charge and fixing a position of a free end of the one or more tension members relative to the composite layup so that the one or more tension members are placed in tension by forming forces applied during drape forming.

A4. The method of paragraph A3, wherein the one or more tension members constrain movement between the plies of the laminated composite charge.

A5. The method of paragraph A2, further comprising interleaving one or more tension members into a composite layup of the laminated composite charge so as to extend from the composite layup in a predetermined direction such that forming forces applied to the one or more tension members cause tension forces to be applied to the laminated composite charge by the one of more tension members.

A6. The method of paragraph A5, wherein the one or more tension members are interleaved into the composite layup so as to extend from the laminated composite charge at an angle between a 0° fiber direction and a 90° fiber direction of the composite layup.

A7. The method of paragraph A1, wherein one or more tension members are interleaved into the laminated composite charge so as to be adjacent at least one ply of the laminated composite charge having a predetermined ply characteristic.

A8. The method of paragraph A7, wherein the predetermined ply characteristic is one or more of a fiber orientation and a position within a composite layup of the laminated composite charge.

A9. The method of paragraph A1, further comprising interleaving one or more tension members into the laminated composite charge at predetermined locations along a length of the laminated composite charge.

A10. The method of paragraph A9, wherein the predetermined locations correspond to geometry changes in a profile of the forming tool.

A11. The method of paragraph A9, wherein the predetermined locations correspond to geometry changes in a profile of the laminated composite charge.

A12. The method of paragraph A1, wherein redirecting the forming forces includes generating tension forces in the laminated composite charge using the forming forces at locations where the forming forces result in compression stress build up in a composite layup of the laminated composite charge.

A13. The method of any one of paragraphs A2 and A12, wherein the tension forces are generated by one or more tension members interleaved in the laminated composite charge where a free end of the one or more tension members is constrained at a fixed location under compressive loading by a drape forming diaphragm and an interleaved end of the one or more tension members pulls on the laminated composite charge under compressive loading by the drape forming diaphragm.

A14. The method of any one of paragraphs A2 and A13, wherein the free end of the one or more tension members is constrained under compressive loading between the drape forming diaphragm and a standoff adjacent the forming tool.

A15. The method of any one of paragraphs A2 and A13, wherein the free end of the one or more tension members is constrained under compressive loading between the drape forming diaphragm and a movable tray adjacent the forming tool, where the drape forming diaphragm moves the movable tray relative to the forming tool.

A16. The method of any one of paragraphs A2 and A13, wherein the fee end of the one or more tension members is constrained under compressive loading between the drape forming diaphragm and a tensioning film extending from the forming tool.

A17. The method of any one of paragraphs A2 and A13, further comprising removing the one or more tension members from the laminated composite charge after drape forming.

B1. A method for drape forming a laminated composite charge, the method comprising:

interleaving tension members into a composite layup of the laminated composite charge, where the tension members are interleaved into the composite layup at one or more locations along a length of the laminated composite charge so that a free end of each of the tension members extends from the composite layup; and applying compressive loading to the tension members with a drape forming diaphragm so that the tension members generate tension forces in the composite layup by pulling on the composite layup to counteract wrinkle forming compressive forces generated in the composite layup during drape forming of the laminated composite charge.

B2. The method of paragraph B1, further comprising constraining the free end of the tension members to a fixed location relative to the laminated composite charge with the drape forming diaphragm.

B3. The method of paragraph B2, wherein the free end of the tension members is constrained under compressive loading between the drape forming diaphragm and a standoff adjacent a forming tool on which the laminated composite charge is placed for drape forming.

B4. The method of paragraph B2, wherein the free end of the tension members is constrained under compressive loading between the drape forming diaphragm and a movable tray adjacent a forming tool on which the laminated composite charge is placed for drape forming, where the drape forming diaphragm moves the movable tray relative to the forming tool.

B5. The method of paragraph B2, wherein the free end of the tension members is constrained under compressive loading between the drape forming diaphragm and a tensioning film extending from a forming tool on which the laminated composite charge is placed for drape forming.

B6. The method of paragraph B1, further comprising removing the tension members from the laminated composite charge after drape forming.

B7. The method of paragraph B1, wherein the tension members are interleaved in the composite layup at locations corresponding to a change in geometry of a forming tool on which the laminated composite charge is placed for drape forming.

B8. The method of paragraph B1, wherein the tension members are interleaved into the composite layup so as to extend from the laminated composite charge at an angle between a 0° fiber direction and 90° fiber direction of the composite layup.

B9. The method of paragraph B1, wherein the tension members are interleaved into the laminated composite charge so as to be adjacent at least one ply of the laminated composite charge having a predetermined ply characteristic.

B10. The method of paragraph B9, wherein the predetermined ply characteristic is one or more of a fiber orientation and a position within a composite layup of the laminated composite charge.

B11. The method of paragraph B1, wherein two or more tension members are stacked on top of each other at a common location along a length of the laminated composite charge.

B12. The method of paragraph B1, wherein the tension members are interleaved in the composite layup at locations corresponding to a change in geometry of the laminated composite charge.

C1. A method for drape forming a laminated composite charge, the method comprising:

forming a laminated composite charge over a forming tool with a drape forming diaphragm, where the laminated composite charge includes one or more profile extensions extending from the laminated composite charge at predetermined locations along a length of the laminated composite charge; and applying tension forces to the laminated composite charge with the one or more profile extensions under compressive loading by the drape forming diaphragm to redirect compressive loading forces on one or more layers of a composite layup of the laminated composite charge and to control an occurrence of inter-laminar wrinkling of the composite layup under compressive loading by the drape forming diaphragm.

C2. The method of paragraph C1, wherein tension forces are applied to the laminated composite charge by the one or more profile extensions, where the one or more profile extensions form tension members.

C3. The method of paragraph C1, wherein the one or more profile extensions constrain movement between plies of the composite layup of the laminated composite charge.

C4. The method of paragraph C1, wherein the tension forces are applied to the laminated composite charge by the one or more profile extension at an angle between a 0° fiber direction and a 90° fiber direction of the composite layup.

C5. The method of paragraph C1, further comprising interleaving the one or more profile extensions into the composite layup so as to be adjacent at least one ply of the composite layup having a predetermined characteristic.

C6. The method of paragraph C5, wherein the predetermined characteristic is one or more of a fiber orientation and a position within the composite layup.

C7. The method of paragraph C1, wherein the predetermined locations correspond to geometry changes of the forming tool.

C8. The method of paragraph C1, wherein the predetermined locations correspond to geometry changes of the laminated composite charge.

D1. A composite part formed using the method of any one of paragraphs A1-A17, B1-12 and C1-C8.

D2. An aircraft including the composite part of paragraph D1.

D3. An airframe including the composite part of paragraph D1.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e,g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions. It should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A method of forming a laminated composite charge, the method comprising steps of:
    placing the laminated composite charge on a forming tool, the laminated composite charge having plies and one or more tension members, wherein:
        the laminated composite charge is shaped and sized so that a finished composite part, having predetermined bounds, is formed by the laminated composite charge;
        the plies form a fiber rosette, having a 0 degree direction, extending along a longitudinal axis of the laminated composite charge, and a 90 degree direction, extending perpendicular to the longitudinal axis;
        the one or more tension members are separate and distinct from the plies and are interleaved between the plies;
        the one or more tension members extend laterally outward from sides of the laminated composite charge, in a direction between the 0 degree direction and the 90 degree direction, to apply a multidirectional tension force to the laminated composite charge; and
        the one or more tension members extend into the plies, so as to be interleaved between the plies, and form part of the laminated composite charge such that the one or more tension members are located outside the predetermined bounds of the finished composite part and are completely removed from the finished composite part as manufacturing excess when the finished composite part is generated from the laminated composite charge;
    drape forming the laminated composite charge so that the one or more tension members are captured between the plies of the laminated composite charge, and wherein capturing the one or more tension members between the plies constrains relative movement between the one or more tension members and the plies of the laminated composite charge; and redirecting forming forces, applied to the laminated composite charge during the step of drape forming the laminated composite charge, to counteract wrinkle forming movement between plies of the laminated composite charge where a lateral component of the multidirectional tension force acts upon span wrinkles, a longitudinal component of the multidirectional tension force acts upon chord wrinkles, and the lateral component and the longitudinal component, in combination, act upon off-angle wrinkles.

2. The method of claim 1, wherein the forming forces are redirected by applying tension forces to the one or more tension members interleaved into a peripheral area of the laminated composite charge.

3. The method of claim 2, wherein the forming forces are redirected by interleaving an interleaved end of the one or more tension members into a composite layup of the laminated composite charge and fixing a position of a free end of the one or more tension members relative to the composite layup so that the one or more tension members are placed in tension by the forming forces applied during the step of drape forming the laminated composite charge.

4. The method of claim 2, further comprising interleaving the one or more tension members into a composite layup of the laminated composite charge so as to extend from the composite layup in a predetermined direction such that the forming forces applied to the one or more tension members cause the tension forces to be applied to the laminated composite charge by the one or more tension members.

5. The method of claim 1, wherein the one or more tension members are interleaved into the laminated composite charge so as to be adjacent at least one ply of the laminated composite charge having a predetermined ply characteristic.

6. The method of claim 1, further comprising interleaving the one or more tension members into the laminated composite charge at predetermined locations along a length of the laminated composite charge.

7. The method of claim 1, wherein redirecting the forming forces includes generating tension forces in the laminated composite charge using the forming forces at locations where the forming forces result in compression stress build up in a composite layup of the laminated composite charge.

8. The method of claim 7, wherein the tension forces are generated by the one or more tension members interleaved in the laminated composite charge where a free end of the one or more tension members is constrained at a fixed location under compressive loading by a drape forming diaphragm and an interleaved end of the one or more tension members pulls on the laminated composite charge under compressive loading by the drape forming diaphragm.

9. The method of claim 8, wherein the free end of the one or more tension members is constrained under compressive loading between the drape forming diaphragm and a standoff adjacent the forming tool.

10. The method of claim 8, wherein the free end of the one or more tension members is constrained under compressive loading between the drape forming diaphragm and a tensioning film extending from the forming tool.

11. The method of claim 1, wherein the one or more tension members form, in combination with a portion of the plies, the manufacturing excess of the laminated composite charge.

12. The method of claim 1, wherein a free end of each of the tension members extends from a respective side of the laminated composite charge past an edge of the plies, forming the respective side of the laminated composite charge.

13. A method of forming a laminated composite charge, the method comprising steps of:

interleaving tension members into a composite layup of the laminated composite charge, where an entirety of each one of the tension members is separate and distinct from plies of the composite layup and the tension members are:
    interleaved between the plies of the composite layup at one or more locations along a length of the laminated composite charge, wherein the laminated composite charge is shaped and sized so that a finished composite part, having predetermined bounds, is formed by the laminated composite charge, and
    form a part of the composite layup where the tension members extend into a peripheral area of the composite layup by a predetermined distance so that:
        each one of the tension members is located outside the predetermined bounds of the finished composite part and is completely removed from the finished composite part as manufacturing excess when the finished composite part is generated; and
        a free end of each of the tension members extends from one side of the composite layup past an edge of each of the plies, forming the one side of the composite layup;

drape forming the laminated composite charge with a drape forming diaphragm; and applying compressive loading to the tension members with the drape forming diaphragm so that the tension members generate tension forces in the composite layup by pulling on the composite layup to counteract wrinkle forming compressive forces generated in the composite layup during the step of drape forming of the laminated composite charge, wherein the tension members are captured between the plies of the composite layup by the compressive loading to constrain relative movement between the tension members and the plies of the composite layup.

14. The method of claim 13, further comprising constraining the free end of each of the tension members to a fixed location relative to the laminated composite charge with the drape forming diaphragm.

15. The method of claim 13, wherein the tension members are interleaved in the composite layup at locations corresponding to a change in geometry of a forming tool on which the laminated composite charge is placed for the step of drape forming the laminated composite charge with the drape forming diaphragm.

16. The method of claim 13, wherein the tension members are interleaved into the composite layup so as to extend from the laminated composite charge at an angle between a 0 degree fiber direction and 90 degree fiber direction of the composite layup.

17. The method of claim 13, wherein two or more of the tension members are stacked on top of each other at a common location along the laminated composite charge.

18. The method of claim 13, wherein the one or more tension members form, in combination with a portion of the plies, the manufacturing excess of the laminated composite charge.

19. A method of forming a composite charge, the method comprising:

forming a laminated composite charge over a forming tool with a drape forming diaphragm, wherein:

the laminated composite charge is shaped and sized so that a finished composite part, having predetermined bounds, is formed by the laminated composite charge;

the laminated composite charge includes plies and tension members;

the plies form a fiber rosette, having a 0 degree direction, extending along a longitudinal axis of the composite charge, and a 90 degree direction, extending perpendicular to the longitudinal axis;

each of the tension members is separate and distinct from the plies; and the tension members extend laterally from sides of the laminated composite charge in a direction between the 0 degree direction and the 90 degree direction to apply a multidirectional tension force to the laminated composite charge and at predetermined locations along a length of the laminated composite charge; and applying tension forces to the laminated composite charge, with the tension members under compressive loading by the drape forming diaphragm, to redirect compressive loading forces on the plies of the laminated composite charge and to control occurrence of inter-laminar wrinkling of the laminated composite charge under compressive loading by the drape forming diaphragm, wherein:

a lateral component of the multidirectional tension force acts upon span wrinkles, a longitudinal component of the multidirectional tension force acts upon chord wrinkles, and the lateral component and the longitudinal component, in combination, act upon off-angle wrinkles; and the tension members are captured and constrained between the plies of the composite charge so as to be interleaved between the plies and to form a part of the laminated composite charge and constrain relative movement between the tension members and the plies of the laminated composite charge, such that the tension members are located outside the predetermined bounds of the finished composite part and are completely removed from the finished composite part as manufacturing excess when the finished composite part is generated from the laminated composite charge.

20. The method of claim 19, wherein:

the tension forces are applied to the laminated composite charge by the tension members.

* * * * *